(12) United States Patent
Chang et al.

(10) Patent No.: US 7,883,654 B2
(45) Date of Patent: Feb. 8, 2011

(54) METHOD FOR FABRICATING MEMBRANE ELECTRODE ASSEMBLY

(75) Inventors: Hwei-Lang Chang, Taoyuan County (TW); Hen-Rong Chang, Taoyuan County (TW); Kuo-Lon Shieh, Taoyuan County (TW); Pi-Hsin Chung, Taoyuan County (TW)

(73) Assignee: Atomic Energy Council-Institute of Nuclear Energy Research, Taoyuan (TW)

( * ) Notice: Subject to any disclaimer, the term of this patent is extended or adjusted under 35 U.S.C. 154(b) by 311 days.

(21) Appl. No.: 11/819,504

(22) Filed: Jun. 27, 2007

(65) Prior Publication Data
US 2010/0201021 A1 Aug. 12, 2010

(51) Int. Cl.
*B29C 39/10* (2006.01)
*B29C 70/72* (2006.01)
*B29C 70/74* (2006.01)
*B29C 70/88* (2006.01)

(52) U.S. Cl. .......... 264/251; 264/254; 264/255; 264/272.15; 264/272.21; 264/104; 264/257

(58) Field of Classification Search .......... None
See application file for complete search history.

(56) References Cited

U.S. PATENT DOCUMENTS

| | | | |
|---|---|---|---|
| 7,326,487 B2 * | 2/2008 | Chang | 429/483 |
| 7,504,174 B2 * | 3/2009 | Lertola | 429/481 |
| 2006/0090317 A1 * | 5/2006 | Wang et al. | 29/2 |
| 2008/0075842 A1 * | 3/2008 | Brewster et al. | 427/115 |
| 2009/0017359 A1 * | 1/2009 | Suzuki | 429/33 |
| 2009/0029039 A1 * | 1/2009 | Okumura et al. | 427/115 |
| 2009/0117437 A1 * | 5/2009 | Liu et al. | 429/33 |
| 2009/0148751 A1 * | 6/2009 | Choi et al. | 429/40 |
| 2009/0173442 A1 * | 7/2009 | Suzuki | 156/297 |
| 2009/0286124 A1 * | 11/2009 | Lee et al. | 429/30 |
| 2010/0086821 A1 * | 4/2010 | Kwon et al. | 429/30 |
| 2010/0129730 A1 * | 5/2010 | Suzuki | 429/483 |
| 2010/0167099 A1 * | 7/2010 | Sung et al. | 429/30 |

FOREIGN PATENT DOCUMENTS

| | | | |
|---|---|---|---|
| JP | 2006-066161 | * | 3/2006 |
| JP | 2006-338938 | * | 12/2006 |
| JP | 2009-9827 | * | 1/2009 |
| JP | 2009-129777 | * | 6/2009 |

* cited by examiner

*Primary Examiner*—Edmund H. Lee
(74) *Attorney, Agent, or Firm*—Jackson IPG PLLC; Demian K. Jackson

(57) ABSTRACT

Two catalyst electrode layers (CEL) are separately formed on two surfaces of a proton exchange membrane (PEM). The structure and processes are simple in the present invention for obtaining a membrane exchange assembly (MEA) with its thickness controllable. The MEA obtained can have a structure of CEL+PEM+CEL'. If a gas diffusion layer (GDL) is added before obtaining the CEL, a MEA having a structure of GDL+CEL+PEM+CEL'+GDL' is obtained.

9 Claims, 8 Drawing Sheets

METHOD FOR FABRICATING MEMBRANE ELECTRODE ASSEMBLY

FIELD OF THE INVENTION

The present invention relates to a membrane electrode assembly (MEA); more particularly, relates to forming two flat catalyst electrode layers (CEL) on two surfaces of a proton exchange membrane (PEM) separately and controlling a thickness of CEL on the MEA.

DESCRIPTION OF THE RELATED ART

A prior art of fabricating an MEA of a fuel cell by printing comprises the following steps:
(a) An ion exchange membrane, an anode catalyst solution and a cathode catalyst solution are prepared.
(b) A desired size of the ion exchange membrane is cut out and put upon a base plate of screen printer.
(d) The ink of a catalyst is evenly screen printed on the ion exchange membrane by using a scraper.
(f) After the ion exchange membrane is laid flat, a catalyst layer is formed on the ion exchange membrane.

Although the prior art forms an anode or cathode catalyst layer on the ion exchange membrane, the ion exchange membrane may easily be wrinkled on touching the anode or cathode catalyst ink. Thus, a catalyst coated PEM layer obtained in this way is wrinkled, not flat. Additional processes for getting rid of the wrinkle are usually required. And, so, processes of printing and wrinkle-removing are repeated for times on coating a thick catalyst layer. Hence, the prior art does not fulfill all users' requests on actual use.

SUMMARY OF THE INVENTION

The main purpose of the present invention is to form flat MEA with a CEL thickness controllable.

To achieve the above purpose, the present invention is a method for fabricating a membrane electrode assembly, comprising steps of preparing, inputting a material, forming, changing side, inputting a material again and forming again, where a temperature-controllable suction plate, which is on the inlet of a vacuum device, is used to suck-flat a PEM; a hollow of a template deposed on the PEM is filled with designed amount of the ink (or said slurry) of catalyst material and then keeps the temperature of the suction plate at the binding temperature for the slurry of catalyst material and the PEM; a convex part of a pressing plate is correspondingly pressed into the hollow of the template to form the first CEL on a surface of the PEM; after cooling down of the suction plate, the PEM is turned over; the slurry of another catalyst material is poured in and a binding temperature is reached; and the convex part of the pressing plate is correspondingly pressed into the hollow of the template to obtain a second CEL' on another surface of the PEM. Accordingly, a novel method for fabricating a MEA is obtained.

BRIEF DESCRIPTIONS OF THE DRAWINGS

Figure 1:
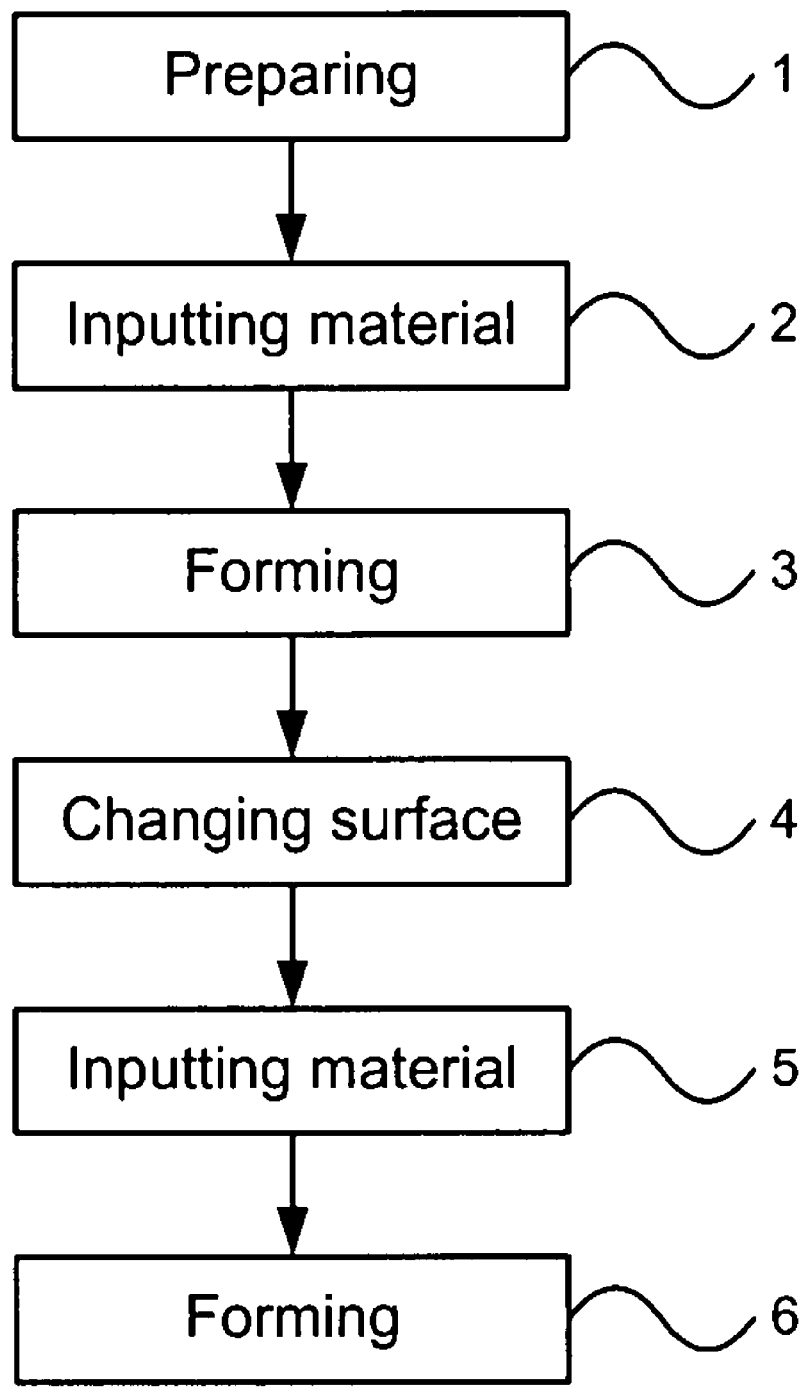
Figure 2:
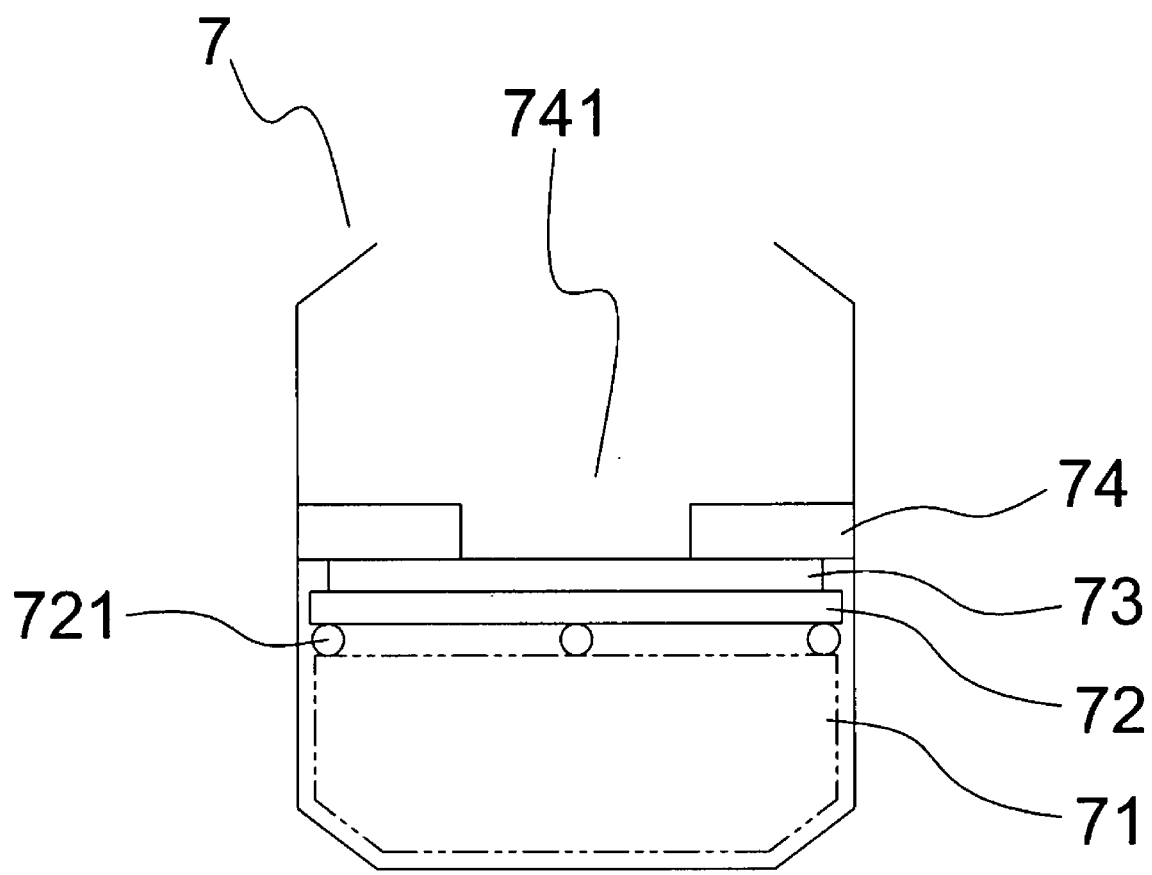
Figure 3:
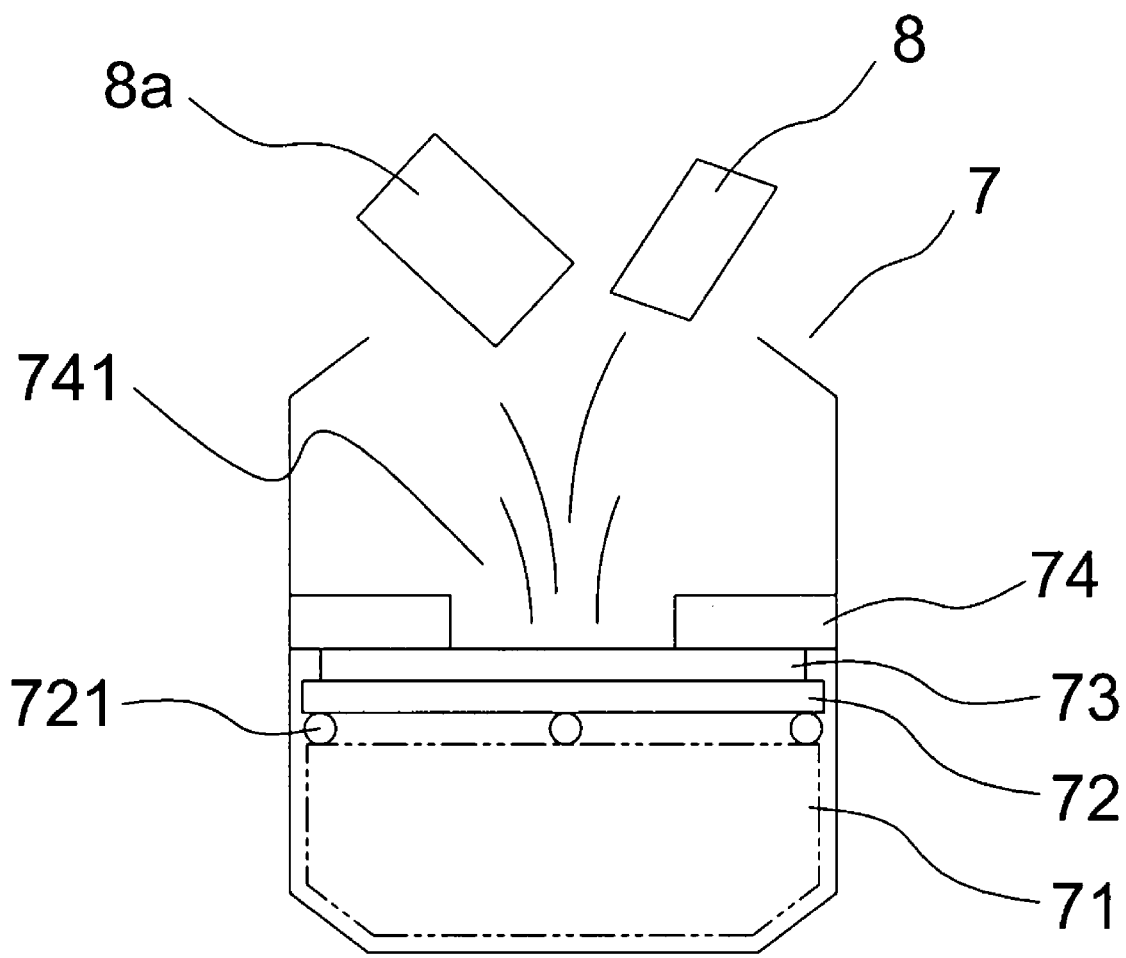
Figure 4:
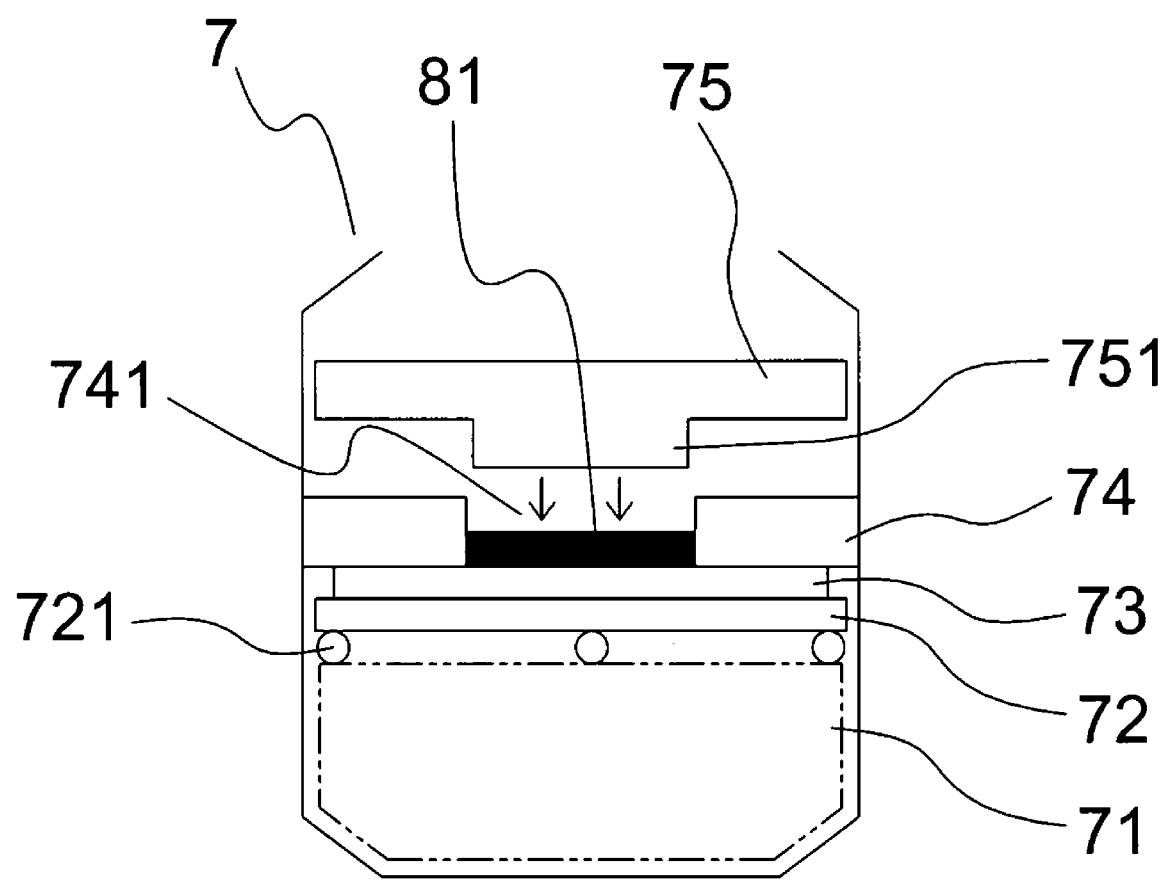
Figure 5:
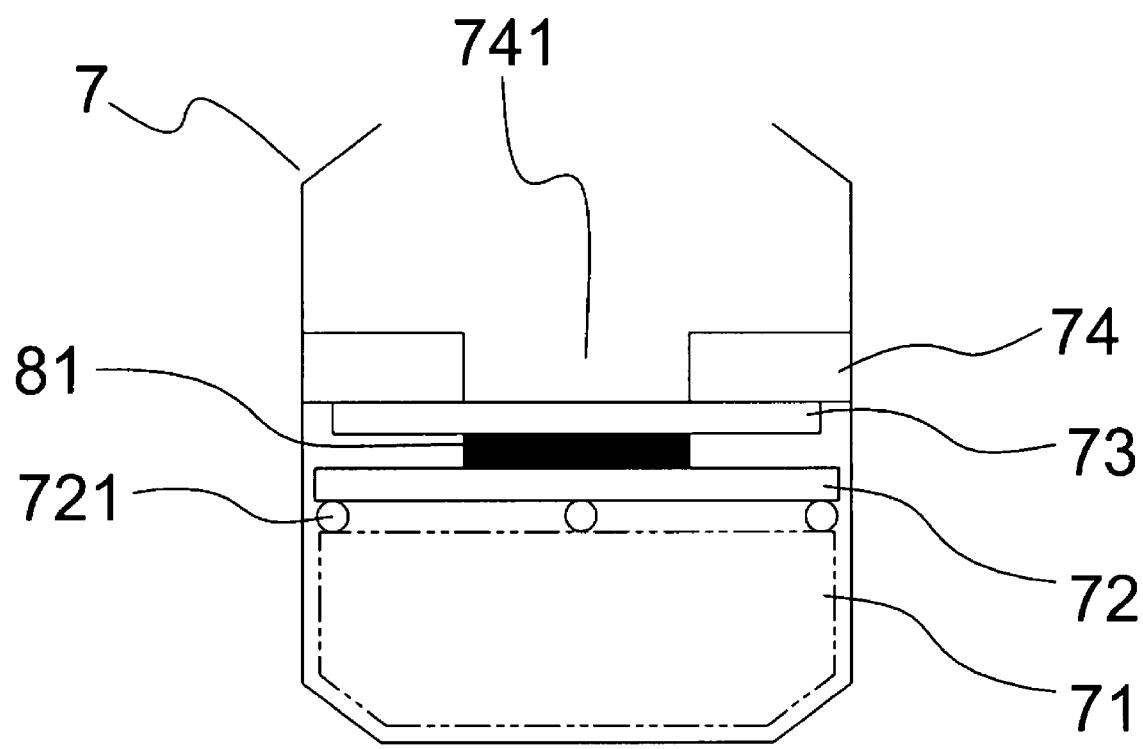
Figure 6:
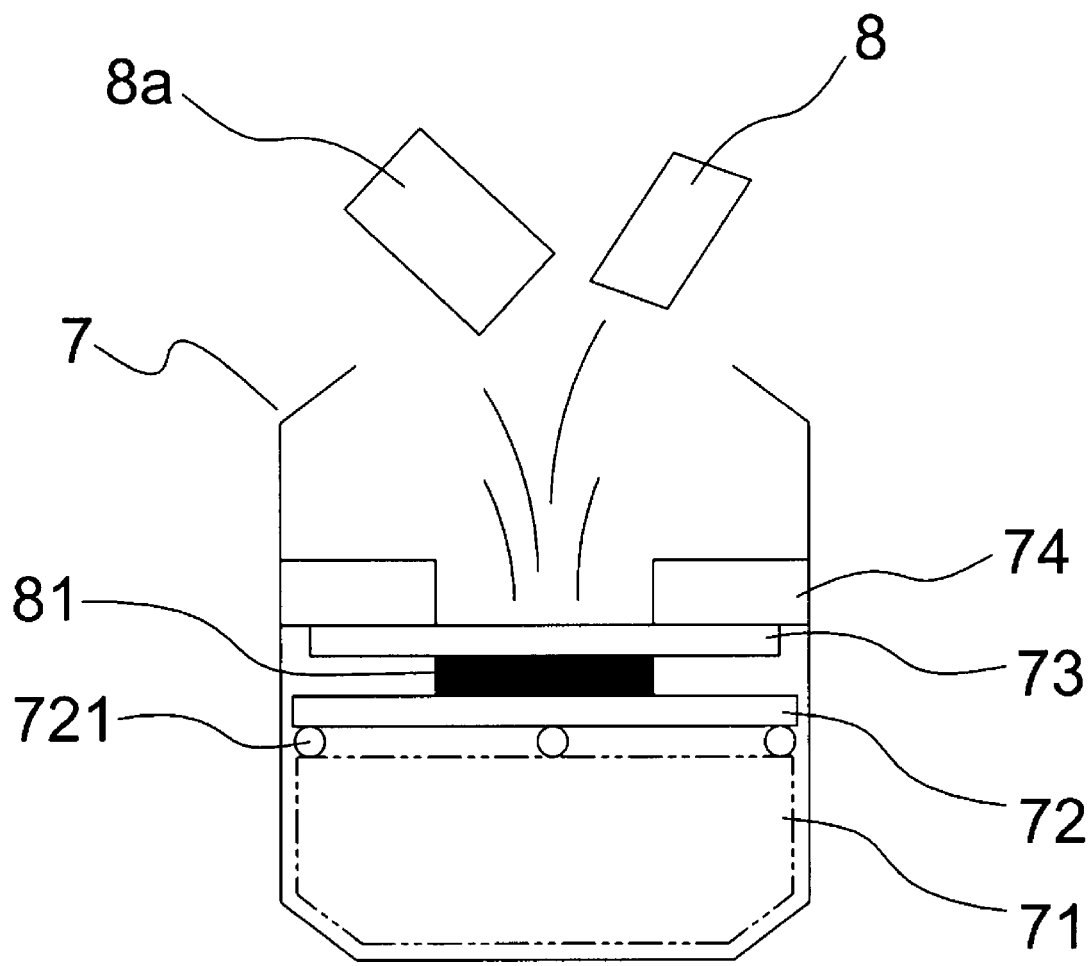
Figure 7:
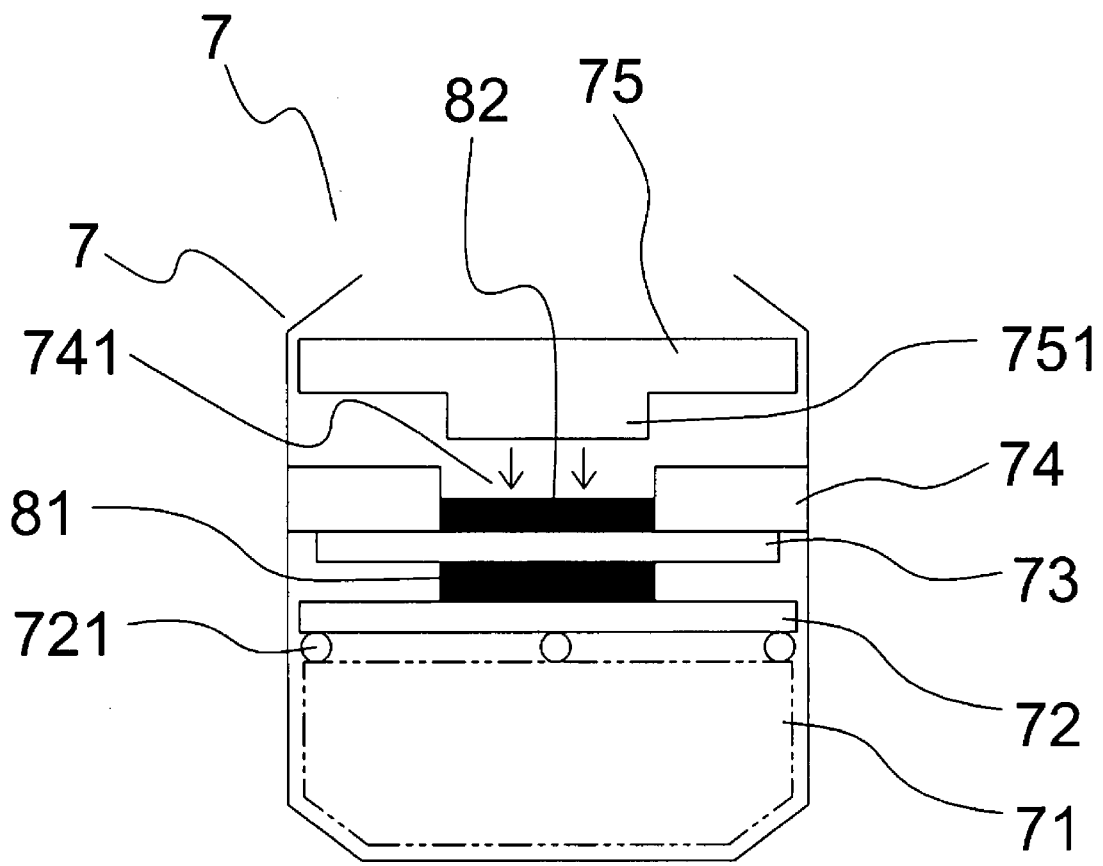
Figure 8:
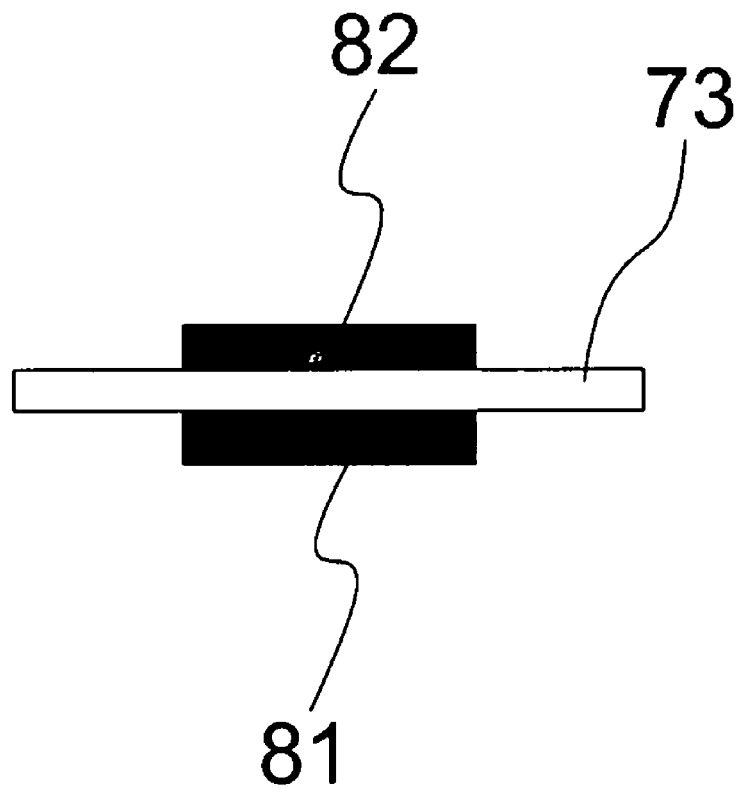

The present invention will be better understood from the following detailed description of the preferred embodiment according to the present invention, taken in conjunction with the accompanying drawings, in which FIG. 1 is the flow view showing the preferred embodiment according to the present invention;
FIG. 2 is the view showing preparing;
FIG. 3 is the view showing inputting the material;
FIG. 4 is the view showing forming;
FIG. 5 is the view showing changing side;
FIG. 6 is the view showing inputting the material again;
FIG. 7 is the view showing forming again; and
FIG. 8 is the view showing the product.

DESCRIPTION OF THE PREFERRED EMBODIMENT

The following description of the preferred embodiment is provided to understand the features and the structures of the present invention.

Please refer to FIG. 1, which is a flow view showing a preferred embodiment according to the present invention. As shown in the figure, the present invention is a method for fabricating a membrane electrode assembly (MEA), comprising steps of preparing 1, inputting a material 2, forming 3, changing side 4, inputting a material again 5 and forming again 6, where two flat catalyst electrode layers (CEL) are formed on two surfaces of a proton exchange membrane (PEM) separately and a thickness of CEL on the MEA is under control. Thus, a novel method for fabricating a MEA is obtained.

Please further refer to FIG. 2 to FIG. 8, which are views showing preparing; inputting a material; forming; changing side; inputting the material again; forming again; and a product obtained. As shown in the figures, the present invention comprises the following steps:

(a) Preparing 1: A vacuum facility 71 is obtained, which is not heated up; or is heated up with a temperature controlled. A suction plate 72 which is set on the inlet of the vacuum facility 71, is made of a drilled plate, a framed plate, a plate of screens, or a sintering material or any combination of the above. A PEM 73 is set on the suction plate 72. The PEM 73 is horizontally fixed on the suction plate through a vacuum effect. Then a template 74 with a hollow 741 is set on the PEM 73.

(b) Inputting material 2: A slurry of anode or cathode catalyst material 8,8a is poured into the hollow 741 of the template 74 in the MEA chamber 7. A temperature-controllable heater 721 in the vacuum facility 71 is activated to heat the suction plate, to raise a temperature to bind the slurry of anode or cathode catalyst material 8,8a and the PEM 73. (If the binding is processed in a room temperature, the temperature is not raised.)

(c) Forming 3: The temperature of the MEA chamber 7 is kept at the binding temperature. Then a pressing plate 74 having a convex part 741 is correspondingly pressed into the hollow 741 of the template 74 to obtain a first CEL 81 on a surface of the PEM 73.

(d) Changing side 4: After the first CEL 81 is obtained on the surface of the PEM 73, the MEA chamber 7 is cooled down; the ventilation effect of the vacuum facility 71 is stopped; and the template 74 is taken out and the PEM 73 is turned over. The ventilation effect of the vacuum facility 71 is activated again to fix the PEM 73 on the suction plate 72, and then the template 74 is deposed on another surface of the PEM 73.

(e) Inputting material again 5: A slurry of anode or cathode catalyst material 8,8a is poured into the hollow 741 of the template 74 again. The temperature-controllable heater 721 in the vacuum facility 71 is activated to heat the suction plate, to raise a temperature to bind the slurry of anode or cathode catalyst material 8,8a and the PEM 73. (If the binding is processed in a room temperature, the temperature is not raised.)

(f) Forming again 6: The temperature of the MEA chamber 7 is kept at the binding temperature. Then the pressing plate 74 having the convex part 741 is correspondingly pressed into the hollow 741 of the template 74 to obtain a second CEL (CEL') 82 on a surface of the PEM 73. Thus, a MEA having three layers (MEA-3-layer) of CEL 81+PEM 73+CEL' 82 is obtained.

If gas diffusion layers (GDL and GDL') are added separately before two times of pressing by the pressing plate 74, a MEA having five layers (MEA-5-layer) of GDL+CEL 81+PEM 73+CEL' 82+GDL' is obtained. The GDL is made of a conductive-carbon-contained fabric, a non-woven fabric or a carbon paper.

For defining the first CEL 81 or the second CEL' 82 as an anode or a cathode, a slurry of anode or cathode catalyst material 8,8a is poured in steps of inputting a material 2 and inputting the material again 5. If the first CEL 81 or the second CEL' 82 is to be defined as an anode, a slurry of anode catalyst material 8 is used, which is a mixture of a Pt/Ru/C carrier and a Nafion solution. If the first CEL or the second CEL' 82 is to be defined as a cathode, a slurry of cathode catalyst material 8a is used, which is a mixture of a Pt/C carrier and a Nafion solution.

For obtaining a thickness of the first CEL 81 or the second CEL' 82, the depth for the convex part 751 of the pressing plate 75 to be correspondingly pressed into the hollow 741 of the template 74 is controlled to obtain the thickness of the first CEL 81 or the second CEL' 82.

To sum up, the present invention is a method for fabricating a membrane electrode assembly, where two flat CELs are formed on two surfaces of a PEM separately and a thickness of CEL on the MEA is under control.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method for fabricating a membrane electrode assembly (MEA), comprising steps of:
    (a) obtaining a MEA chamber having a vacuum facility, said vacuum facility having a suction plate, a proton exchange membrane (PEM) being fixed on said suction plate through a vacuum effect, a template being deposed on said PEM, said template having a hollow;
    (b) inputting a slurry of catalyst material into said hollow of said template, a binding being processed at a binding processing temperature selected from a group consisting of a room temperature and a binding temperature of said slurry of catalyst material and said PEM, said binding processing temperature at which the binding is processed being obtained by activating a temperature-controllable heater to heat up a temperature of said suction plate;
    (c) keeping said suction plate at said binding processing temperature and pressing a pressing plate having a convex part into said hollow of said template at said catalysis temperature to obtain a first catalyst electrode layer (CEL) on a surface of said PEM;
    (d) after obtaining said first CEL on said surface of said PEM, cooling down said template, taking said template out of said vacuum facility, turning over said PEM, re-activating said vacuum facility to fix said PEM on said suction plate through said vacuum effect, and then deposing said template on another surface of said PEM;
    (e) inputting said slurry of catalyst material into said hollow of said template again, a binding being processed at said binding processing temperature; and
    (f) keeping said suction plate at said binding processing temperature and pressing said pressing plate having said convex part into said hollow of said template again at said binding temperature to obtain a second CEL (CEL') on said another surface of said PEM and to obtain a MEA having three layers (MEA-3-layer) of CEL+PEM+CEL'.

2. The method according to claim 1,
    wherein said suction plate is a plate made of a sintering material or is selected from a group consisting of a drilled plate, a framed plate, a plate of screens, and any combination of above said plates; and
    wherein said plate has a ventilationable surface at a place selected from a group consisting of an upper side and outside.

3. The method according to claim 1,
    wherein said slurry of catalyst material is a slurry obtained by mixing a Pt/Ru/C carrier and a perfluroinated ion-exchange solution.

4. The method according to claim 1,
    wherein said slurry of catalyst material is a slurry by mixing a Pt/C carrier and a perfluroinated ion-exchange solution.

5. A method for fabricating a membrane electrode assembly (MEA), comprising steps of:
    (a) obtaining a MEA chamber having a vacuum facility, said vacuum facility having a suction plate, a PEM being fixed on said suction plate through a vacuum effect, a template being deposed on said PEM, said template having a hollow;
    (b) inputting a slurry of catalyst material into said hollow of said template and adding a first gas diffusion layer (GDL), a binding being processed at a binding processing temperature selected from a group consisting of a room temperature and a binding temperature of said slurry of catalyst material and said PEM, said binding processing temperature at which the binding is processed being obtained by activating a temperature-controllable heater to heat up a temperature of said suction plate;
    (c) keeping said suction plate at said binding processing temperature and pressing a pressing plate having a convex part into said hollow of said template at said catalysis temperature to obtain a first CEL on a surface of said PEM;
    (d) after obtaining said first CEL on said surface of said PEM, cooling down said template, taking said template out of said vacuum facility, turning over said PEM, re-activating said vacuum facility to fix said PEM on said suction plate through said vacuum effect, and then deposing said template on another surface of said PEM;
    (e) inputting said slurry of catalyst material into said hollow of said template again and adding a second GDL (GDL'), a binding being processed at said binding processing temperature; and
    (f) keeping said suction plate at said binding processing temperature and pressing said pressing plate having said convex part into said hollow of said template at said binding temperature to obtain a second CEL (CEL') on said another surface of said PEM and to obtain a MEA having five layers (MEA-5-layer) of GDL+CEL+PEM+CEL'+GDL'.

6. The method according to claim 5,
wherein said suction plate is a plate made of a sintering material or is selected from a group consisting of a drilled plate, a framed plate, a plate of screens, and any combination of above said plates; and
wherein said plate has a ventilationable surface at a place selected from a group consisting of an upper side and outside.

7. The method according to claim 5,
wherein said slurry of catalyst material is a slurry obtained by mixing a Pt/Ru/C carrier and a perfluroinated ion-exchange solution.

8. The method according to claim 5,
wherein said slurry of catalyst material is a slurry obtained by mixing a Pt/C carrier and a perfluroinated ion-exchange solution.

9. The method according to claim 5,
wherein said GDL is made of a ventilative material selected from a group consisting of a conductive-carbon-contained fabric, a non-woven fabric and a carbon paper.

* * * * *